US008224546B2

(12) United States Patent
Terasaka

(10) Patent No.: US 8,224,546 B2
(45) Date of Patent: Jul. 17, 2012

(54) ABS CONTROL SYSTEM

(75) Inventor: Masato Terasaka, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 551 days.

(21) Appl. No.: 11/290,423

(22) Filed: Dec. 1, 2005

(65) Prior Publication Data

US 2006/0122760 A1   Jun. 8, 2006

(30) Foreign Application Priority Data

Dec. 2, 2004  (JP) ............................... 2004-349915

(51) Int. Cl.
B60T 8/72   (2006.01)
B60T 7/12   (2006.01)
G05D 1/00   (2006.01)
G06F 7/00   (2006.01)
G06F 17/00  (2006.01)
B60B 39/00  (2006.01)

(52) U.S. Cl. ........................................ 701/73; 701/71
(58) Field of Classification Search .................. 701/38, 701/69, 71, 73, 79
See application file for complete search history.

(56) References Cited

U.S. PATENT DOCUMENTS

| 3,909,070 | A | | 9/1975 | Leiber |
| 5,100,209 | A | * | 3/1992 | Arikawa ........................ 303/149 |
| 5,358,319 | A | * | 10/1994 | Negrin ........................... 303/149 |
| 5,518,308 | A | | 5/1996 | Sugawara |
| 5,520,448 | A | | 5/1996 | Okubo |
| 5,551,769 | A | * | 9/1996 | Luckevich ..................... 303/149 |
| 5,752,751 | A | * | 5/1998 | Nakaura ..................... 303/122.06 |
| 5,799,261 | A | * | 8/1998 | Ozaki et al. ..................... 701/78 |
| 5,897,601 | A | * | 4/1999 | Suzuki ............................ 701/78 |
| 5,987,601 | A | * | 11/1999 | Donovan ....................... 712/244 |
| 6,272,417 | B1 | | 8/2001 | Ross et al. |
| 6,381,531 | B1 | | 4/2002 | Schmidt |
| 2004/0019423 | A1 | * | 1/2004 | Yasui et al. ..................... 701/71 |
| 2004/0128052 | A1 | * | 7/2004 | Nihei et al. ..................... 701/71 |
| 2005/0131604 | A1 | * | 6/2005 | Lu ................................. 701/38 |

FOREIGN PATENT DOCUMENTS

| DE | 26 10 585 | 9/1977 |
| DE | 101 27 828 | 1/2002 |
| GB | 1 444 940 | 9/1973 |
| JP | A-H06-144187 | 5/1994 |
| JP | A-8-99622 | 4/1996 |
| JP | A-H09-202224 | 8/1997 |

OTHER PUBLICATIONS

Office Action mailed Sep. 8, 2009 from the Japan Patent Office in corresponding Japanese Patent Application No. 2004-349915 (and English translation).

* cited by examiner

Primary Examiner — Tuan C. To
Assistant Examiner — Imran Mustafa
(74) Attorney, Agent, or Firm — Posz Law Group, PLC

(57) ABSTRACT

A second threshold value which is smaller than a first threshold value is set as a threshold value for starting pressure decrease control of a wheel on a high μ road surface side when a select low control is employed. Then, if a slip ratio of the wheel on the high μ road surface side exceeds the second threshold value, a pressure decrease control in ABS control is started even if the slip ratio of a wheel on a low μ road surface side does not exceed the first threshold value. Accordingly, it is possible to prevent the vehicle running state from becoming unstable due to the wheel speed of the wheel on the high μ road surface side from decreasing with respect to the vehicle speed.

15 Claims, 8 Drawing Sheets

ABS CONTROL SYSTEM

CROSS REFERENCE TO RELATED APPLICATION

This application is based upon and claims the benefit of Japanese Patent Application No. 2004-349915 filed on Dec. 2, 2004, the content of which are incorporated herein by reference.

FIELD OF THE INVENTION

The present invention relates to an ABS control system in which is executed ABS control that prevents wheels of a vehicle from slipping.

BACKGROUND OF THE INVENTION

ABS control which prevents wheels of a vehicle from slipping has been known. When the wheel speed decreases with respect to the vehicle body speed and a slip ratio, which is expressed as the quotient of the difference between the wheel speed and the vehicle body speed divided by the vehicle body speed, exceeds a predetermined threshold value, ABS control make the wheel speed to return a value closer the vehicle body speed and prevents the wheel from slipping by starting a pressure decrease in the wheel cylinder (hereinafter simply referred to as "W/C") pressure.

With this kind of ABS control, when the coefficient of friction of the road surface on which the vehicle is traveling (hereinafter referred to as "road surface $\mu$ value") is the same for all four wheels, a threshold value which becomes the ABS control start reference for each wheel is set to be the same. In a typical passenger vehicle, ABS control is performed independently for the left and right front wheels, and ABS control is performed simultaneously for the left and right rear wheels.

In cases such as when the road surface $\mu$ value for the left wheel is different from that for the right wheel, as it is on a split road surface, however, the threshold values for starting ABS control in the left and right wheels are different. Therefore, ABS control such as that described below is conventionally executed.

For example, when ABS control is performed independently for the left and right front wheels and ABS control is performed simultaneously for the left and right rear wheels, if a split road surface is detected, a select high control or a select low control is employed (see Japanese Patent Application Publication No. JP-A-08-099622, for example).

Select high control refers to starting a pressure decrease control simultaneously for the left and right wheels when the slip ratio of the wheel that is rotating faster, i.e., the wheel on the side with the road surface having a high road surface $\mu$ value (hereinafter simply referred to as "high $\mu$ road surface"), exceeds a threshold value for starting pressure decrease control in ABS control.

Select low control conversely refers to starting a pressure decrease control simultaneously for the left and right wheels when the slip ratio of the wheel that is rotating slower, i.e., the wheel on the side with the road surface having a low road surface $\mu$ value (hereinafter simply referred to as "low $\mu$ road surface"), exceeds a threshold value for starting pressure decrease control in ABS control.

In the control mode in which select high control is employed, the threshold value for starting pressure decrease control in ABS control in the wheel on the high $\mu$ road surface side is set on the low side and the start of pressure decrease control for the wheel on the low $\mu$ road surface side is delayed until the slip ratio of the wheel on the high $\mu$ road surface side exceeds the threshold value for starting pressure decrease control. Accordingly, braking force of the wheel of the high $\mu$ road surface side is inhibited from being reduced more than is necessary.

In the control mode in which select low control is employed, the wheel on the low $\mu$ road surface side is reliably prevented from slipping by also starting the pressure decrease control for the wheel on the high $\mu$ road surface side when the slip ratio of the wheel on the low $\mu$ road surface side exceeds the threshold value for starting pressure decrease control.

In this select low control, the threshold value to start pressure decrease control of the wheel on the low $\mu$ road surface side is set, but the threshold value to start pressure decrease control of the wheel on the high $\mu$ road surface side is not specifically set. That is, the wheel speed of the wheel on the high $\mu$ road surface side will not decrease below the wheel speed of the wheel on the low $\mu$ road surface side. Therefore, as long as the threshold value for starting pressure decrease control of the wheel on the low $\mu$ road surface side is set, the pressure decrease control for the wheel on the high $\mu$ road surface side also starts at the same time the pressure decrease control for the wheel on the low $\mu$ road surface side starts, so it is not particularly necessary to set the threshold value for starting the pressure decrease control of the wheel on the high $\mu$ road surface side.

Even with this control mode in which the select low control is employed, however, the braking force of the wheel on the high $\mu$ road surface side may become greater than the braking force of the wheel on the low $\mu$ road surface side due to variation in the hydraulic pressure control performance of the ABS control unit based on manufacturing error of a differential pressure control valve and depending on the effectiveness of the brakes. That is there is variation in the operational characteristics of the control valves used in ABS control which is caused, for example, by dimensional error of the structural members and variation in the constant of spring of elastic members. Even if the exciting current is the same, the control hydraulic pressure is not necessarily the same. In such cases, slip may be generated at the wheel on the high $\mu$ road surface side and the vehicle may become unstable.

This case will be described with reference to FIGS. 8A and 8B. FIGS. 8A and 8B are timing charts of the W/C pressure and the wheel speed, and the vehicle speed (estimated vehicle body speed) during braking on a split road surface when the select low control is employed. However, the W/C pressure and wheel speed shown in FIGS. 8A and 8B represent the W/C pressure and wheel speed of each wheel which is a wheel group in which ABS control is executed simultaneously for the left and right wheels. Further, the threshold value for starting pressure decrease control indicated in FIGS. 8A and 8B does not represent the slip ratio itself, but the wheel speed, with respect to the vehicle speed at that time, at which the threshold value for starting pressure decrease control will be reached.

As shown in FIGS. 8A and 8B, in the case of a split road surface, the way in which the wheel speed of the wheel on the low $\mu$ road surface side decreases with respect to the vehicle speed during braking is different from that of the wheel speed of the wheel on the high $\mu$ road surface side. That is, the wheel speed of the wheel on the low $\mu$ road surface side decreases more with respect to the vehicle speed than does the wheel speed of the wheel on the high $\mu$ road surface side.

At this time, if there is no variation in the braking force generated on the wheels of the high $\mu$ road surface side and the low $\mu$ road surface side, then the pressurization of the W/C pressure is equal, as shown in FIG. 8A. Therefore, while the wheel speed of the wheel on the high μ road surface side is substantially equal to the vehicle speed, the wheel speed of the wheel on the low μ road surface side exceeds the threshold value for starting pressure decrease control of the ABS control that was set for the wheel on the low μ road surface side and the pressure decrease control of the W/C pressure of the wheel on the low μ road surface side is started. At the same time, pressure decrease control of the W/C pressure of the wheel on the high μ road surface side is also started.

In such a case, stability of the vehicle can be maintained because there is virtually no decrease in the wheel speed of the wheel on the high μ road surface side with respect to the vehicle speed.

When there is variation in the braking force generated on the wheels on the high μ road surface side and the low μ road surface side, and the braking force of the wheel on the high μ road surface side is greater than that of the wheel on the low μ road surface side, the W/C pressure of the wheel on the high μ road surface side is pressurized sooner than the W/C pressure of the wheel on the low μ road surface side, as shown in FIG. 8B. Therefore, even if it takes only a short time at which the wheel speed of the wheel on the low μ road surface side decreases with respect to the vehicle speed and exceeds the threshold value for starting pressure decrease control of the ABS control, the wheel speed of the wheel on the high μ road surface side ends up decreasing with respect to the vehicle speed.

In such a case, the wheel on the high μ road surface side slips, causing a loss of vehicle stability.

SUMMARY OF THE INVENTION

It is thus an object of the present invention to, in an ABS control system that performs ABS control simultaneously in right and left wheels in at least one of a front wheel group or a rear wheel group, improve vehicle stability during the vehicle is running on a split road surface when there is variation in braking force generated in the left and right wheels for which ABS control is simultaneously performed.

A first aspect of the present invention relates to an ABS control system which is provided with a high μ road surface side pressure decrease control start threshold value setting portion which sets a second threshold value which is smaller than a first threshold value as a threshold value for starting pressure decrease control for a wheel on a high μ road surface side when a select low control is executed. Furthermore, when a slip ratio of the wheel on the high μ road surface side exceeds the second threshold value, pressure decrease control in the ABS control is started for the wheel on the high μ road surface side as well as for the wheel on the low μ road surface side regardless of the slip ratio of the wheel on the low μ road surface side.

In this way, when the select low control is employed, the second threshold value, which is smaller than the first threshold value, is set as the threshold value for starting pressure decrease control for the wheel on the high μ road surface side. When the slip ratio of the wheel on the high μ road surface side exceeds the second threshold value, the pressure decrease control in the ABS control is started even if the slip ratio of the wheel on the low μ road surface side does not exceed the first threshold value.

Accordingly, it is possible to prevent the vehicle running state from becoming unstable due to the wheel speed of the wheel on the high μ road surface side decreasing with respect to the vehicle speed.

In this case, the pressure decrease time of the pressure decrease control in the ABS control can be set by a pressure decrease time setting portion to become longer as the slip ratio of the wheel on the high μ road surface side becomes larger when the slip ratio of the wheel on the high μ road surface side exceeds the second threshold value.

For example, in a case where the high μ road surface side pressure decrease control start threshold value setting portion sets a plurality of second threshold values of different values and the pressure decrease control in the ABS control is started when the slip ratio of the wheel on the high μ road surface side exceeds a first and smallest second threshold value from among the second threshold values, the pressure decrease time setting portion can set the pressure decrease time based on the number of second threshold values exceeded from among the plurality of second threshold values that were set at different values.

Further, the pressure decrease time setting portion can also obtain a peak value after the slip ratio of the wheel on the high μ road surface side exceeds the second threshold value, and set the pressure decrease time in accordance with the peak value.

Moreover, a third threshold value which is smaller than the second threshold value can be set by a pressure maintain control start threshold value setting portion as a threshold value for starting pressure maintain control of the wheel on the high μ road surface side when the select low control is executed, and pressure maintain control can also be performed for the wheel on the high μ road surface side when the slip ratio of the wheel on the high μ road surface side exceeds the third threshold value.

In this way, when the third threshold value, which is smaller than the second threshold value, is set and the slip ratio of the wheel on the high μ road surface side exceeds this third threshold value, pressure maintain control, not pressure decrease control, is first started. Thus the W/C pressure can be maintained, enabling the braking force to be maintained, which makes it possible to prevent a loss of braking force as would otherwise happen if pressure decrease control had been started.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
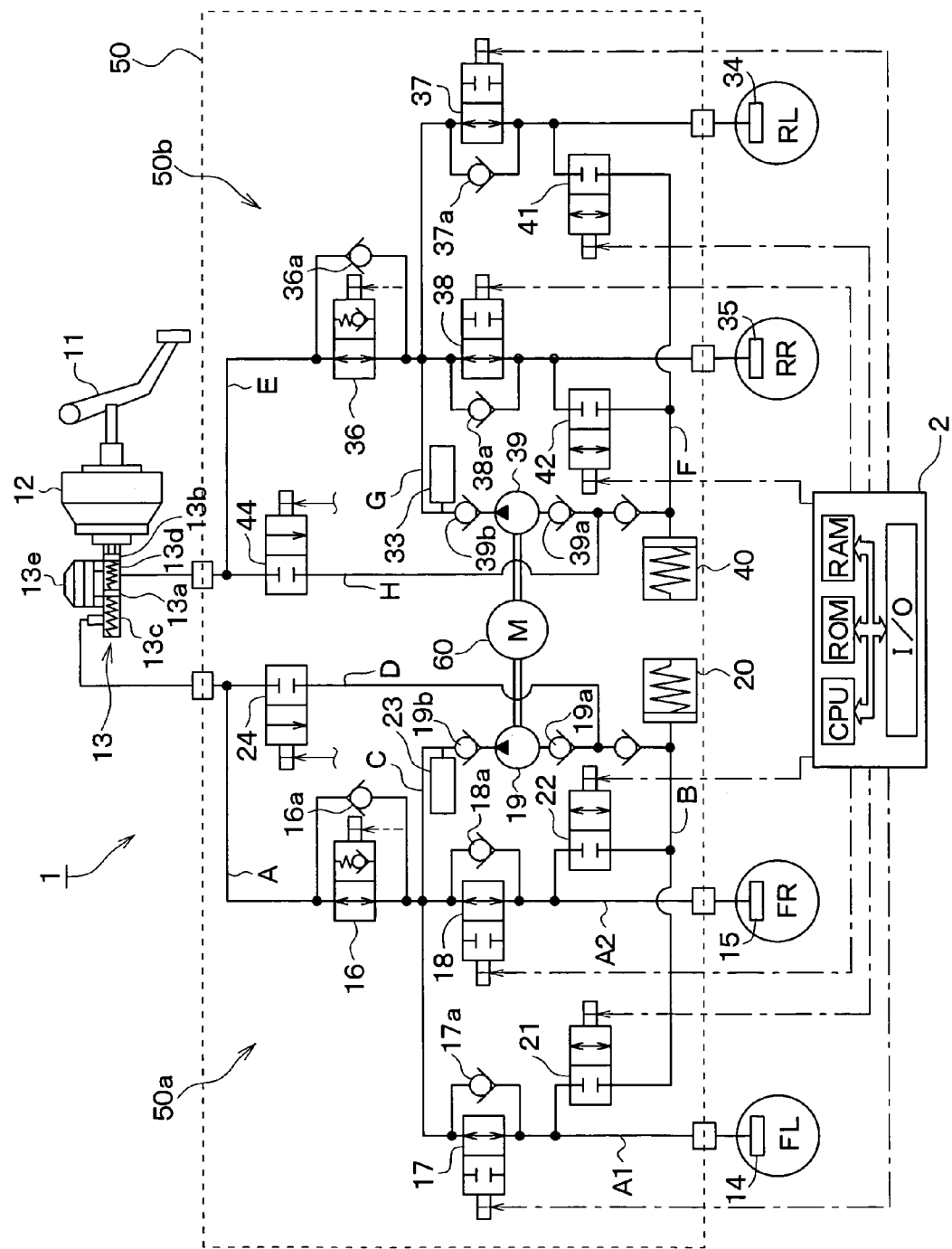
FIG. 1 is a schematic view showing the structure of a brake system which realizes an ABS control system according to a first embodiment of the present invention.

The present invention will be described further with reference to various embodiments in the drawings.

First Embodiment

FIG. 1 is a schematic view showing the structure of a brake system 1 which realizes an ABS control system according to a first embodiment of the present invention. The basic structure of the brake system 1 illustrated in the present embodiment will be described based on this drawing.

The present embodiment will describe the brake system 1 which is provided with an ABS actuator 50 for front and rear brake piping system including a first brake system 50a which controls brake fluid pressure applied to left and right front wheels and a second brake system 50b which controls brake fluid pressure applied to left and right rear wheels.

A brake pedal 11 serving as a brake operating member which is depressed by a driver to apply braking force to the vehicle is connected to a master cylinder (hereinafter simply referred to as "M/C") 13 and a brake booster 12. The brake pedal 11, the brake booster 12 and the M/C 13 serve as a brake fluid pressure generating source. When the driver depresses the brake pedal 11, the depression force is boosted by the brake booster 12 and pushes against master pistons 13a and 13b arranged in the M/C 13. Accordingly, the same M/C pressure is generated in a primary chamber 13c and a secondary chamber 13d which are divided by the master pistons 13a and 13b.

The M/C 13 includes a master reservoir 13e which has passages that provide communication between it and the primary chamber 13c and the secondary chamber 13d. The master reservoir 13e supplies brake fluid to the M/C 13 through these passages and stores excess brake fluid in the M/C 13. Each of the passages is formed with a diameter that is much smaller than the diameter of the main brake conduits extending from the primary chamber 13c and the secondary chamber 13d, such that an orifice effect is displayed when brake fluid flows from the side of the primary chamber 13c and the secondary chamber 13d of the M/C 13 into the master reservoir 13e.

The M/C pressure generated in the M/C 13 is transmitted to W/Cs 14 and 15 through the first brake system 50a and to W/Cs 34 and 35 through the second brake system 50b.

These brake systems 50a and 50b will be described below. However, because the first brake system 50a and the second brake system 50b have substantially the same structure, only the first brake system 50a will be described here. The second brake system 50b can be understood by referring to the first brake system 50a, so a description thereof will be omitted.

The first brake system 50a is provided with a brake conduit A which serves as a main brake conduit that transmits the M/C pressure described above to the W/C 14 provided in the left front wheel FL and the W/C 15 provided in the right front wheel FR. W/C pressure is generated in each of the W/C 14 and 15 through this brake conduit A.

Also, a first differential pressure control valve 16 is provided in brake conduit A. This first differential pressure control valve 16 is an electromagnetic valve that is able to be controlled into open state (i.e., so as to allow brake fluid to flow through it) and differential pressure state (i.e., so as to create a pressure difference). The first differential pressure control valve 16 is set to the open state during normal braking and switches to the differential pressure state when electricity is supplied to a solenoid coil. When the first differential pressure control valve 16 is set to the differential pressure state, brake fluid is allowed to flow only from the W/C 14 and 15 side to the M/C 13 side only when the brake fluid pressure on the W/C 14 and 15 side is equal to or greater than a pressure that is a predetermined M/C pressure. Therefore, during normal operation, the brake fluid pressure on the W/C 14 and 15 sides is maintained so as not to become equal to, or greater than, a predetermined pressure greater than the pressure on the M/C 13 side in order to protect the brake conduits.

Also, brake conduit A divides into two brake conduits A1 and A2 downstream of the first differential pressure control valve 16 on the W/C 14 and 15 sides. In one brake conduit A1 is provided a first pressure increase control valve 17 which controls a pressure increase in the brake fluid pressure to the W/C 14. In the other brake conduit A2 is provided a second pressure increase control valve 18 which controls a pressure increase in the brake fluid pressure to the W/C 15.

The first and second pressure increase control valves 17 and 18 are electromagnetic valves which can be controlled into open state and closed state. When the first and second pressure increase control valves 17 and 18 are controlled so as to be open state, M/C pressure or brake fluid pressure generated by the discharge of brake fluid from a pump 19, to be described later, is able to be applied to the W/C 14 and 15.

During normal braking performed by the driver operating the brake pedal 11, the first differential pressure control valve 16 and the first and second pressure increase control valves 17 and 18 are controlled so as to be normally open.

Further, a safety valve 16a is provided in parallel with the first differential pressure control valve 16, a safety valve 17a is provided in parallel with the first pressure increase control valve 17, and a safety valve 18a is provided in parallel with the second pressure increase control valve 18. The safety valve 16a of the first differential pressure control valve 16 is provided to allow the M/C pressure to be transmitted to the W/C 14 and 15 in a case where the driver depresses the brake pedal 11 when the first differential pressure control valve 16 is set to the differential pressure state. Also, the safety valves 17a and 18a of the pressure increase control valves 17 and 18, respectively, are provided such that, when the driver releases the brake pedal 11 while the pressure increase control valves 17 and 18 are controlled to be closed during ABS control, in particular, the W/C pressure of the left front wheel FL and the right front wheel FR can be reduced in response to that release operation.

A first pressure decrease control valve 21 and a second pressure decrease control valve 22, which are both two-position electromagnetic valves that can be controlled so as to be either open or closed, are arranged in a brake conduit B that connects a reservoir hole in a reservoir 20 to brake conduit A1 between the first pressure increase control valve 17 and the W/C 14, as well as to brake conduit A2 between the second pressure increase control valve 18 and the W/C 15. The first and second pressure decrease control valves 21 and 22 are normally closed during normal braking.

A brake conduit C is arranged so as to connect the reservoir 20 to brake conduit A, i.e., the main brake conduit. A self-priming pump 19 which is driven by a motor 60 is provided in brake conduit C to suck up brake fluid from the reservoir 20 and discharge it to the M/C 13 side or the W/C 14 and 15 sides.

The pump 19 is provided with safety valves 19a and 19b to enable one-way suction and discharge. Also, a fixed displacement damper 23 is arranged on the discharge side of the pump 19 in brake conduit C in order to mitigate the pulsation of the brake fluid discharged by the pump 19.

A brake conduit D, in which a first control valve 24 that can be controlled open state or closed state is provided, connects the primary chamber 13c of the M/C 13 to brake conduit C between the pump 19 and the reservoir 20.

By sucking brake fluid up with the pump 19 from the M/C 13 through this brake conduit D and discharging it to brake conduit A, the brake fluid can be supplied to the W/C 14 and 15 side during ABS control and the like, thereby enabling the W/C pressure of the wheel to be increased.

Meanwhile, as described above, the second brake system 50b has generally the same structure as the first brake system 50a. That is, the first differential pressure control valve 16 corresponds to a second differential pressure control valve 36. The first and second pressure increase control valves 17 and 18 correspond to third and fourth pressure increase control valves 37 and 38, respectively. The first and second pressure decrease control valves 21 and 22 correspond to third and fourth pressure decrease control valves 41 and 42, respectively. The first control valve 24 corresponds to a second control valve 44. The pump 19 corresponds to a pump 39. Also, brake conduit A corresponds to a brake conduit E, brake conduit B corresponds to a brake conduit F, brake conduit C corresponds to a brake conduit G, and brake conduit D corresponds to a brake conduit H. In this way, the ABS actuator 50 is formed.

The voltage applied to the motor 60 is controlled based on electrical signals from an electronic control unit (hereinafter simply referred to as "ECU") 2 to drive the pumps 19 and 39 and the various control valves 16 to 18, 21, 22, 24, 36 to 38, 41, 42, and 44 of the ABS actuator 50 structured as described above. Accordingly, the W/C pressure generated in each W/C 14, 15, 34, and 35 is able to be controlled.

According to the ABS actuator 50 with above mentioned configuration, during normal braking, those control valves are in the positions shown in FIG. 1. When M/C pressure is generated according to the depression amount of the brake pedal 11, that M/C pressure is transmitted to the W/Cs 14, 15, 34, and 35 such that braking force is generated in each wheel.

During ABS control, the pumps 19 and 39, and the various control valves 16 to 18, 21, 22, 24, 36 to 38, 41, 42, and 44, are all driven according to the various control modes, i.e., pressure decrease control, pressure maintain control, and pressure increase (pulse increase) control.

First, at the start of the pressure decrease control, when a pressure decrease mode is set the pressure decrease control valves 14, 15, 34, and 35 of the wheels to be controlled are opened and the pressure increase control valves 17, 18, 37, and 38 are closed states. The pumps 19 and 39 are then driven and the W/C pressure decreases. Next, when a pressure maintain mode is set in the pressure maintain control, the pressure decrease control valves 14, 15, 34, and 35 of the wheels to be controlled and the pressure increase control valves 17, 18, 37, and 38 are all closed states so as to maintain the W/C pressure. Then when a pressure increase mode is set in the pressure increase (pulse increase) control, the pressure decrease control valves 14, 15, 34, and 35 of the wheels to be controlled are closed states and the pressure increase control valves 17, 18, 37, and 38 are appropriately switched between open and closed states so as to increase the W/C pressure. In this way, ABS control is executed.

The ECU 2 is a known microcomputer which includes a CPU, ROM, RAM, I/O, and the like. The ECU 2 executes an ABS control routine according to a program stored in the ROM. That is, the ECU 2 executes ABS control by inputting detection signals and the like from wheel speed sensors, not shown, and the like, performing various calculations for executing ABS control, and then outputting electric signals in accordance with the various control modes to the motor 60 and the various control valves 16 to 18, 21, 22, 24, 36 to 38, 41, 42, and 44.

Next, the ABS control routine executed by the ECU 2 of the brake system 1 will be described in detail. However, the ABS control routine illustrated in the present embodiment is basically the same as that of related art, and only differs with respect to the routine for setting the threshold value for starting pressure decrease control in ABS control and the routine for driving the actuator. Therefore, only these parts that differ will be described, i.e., descriptions of parts that are the same as the related art will be omitted.

Figure 2:
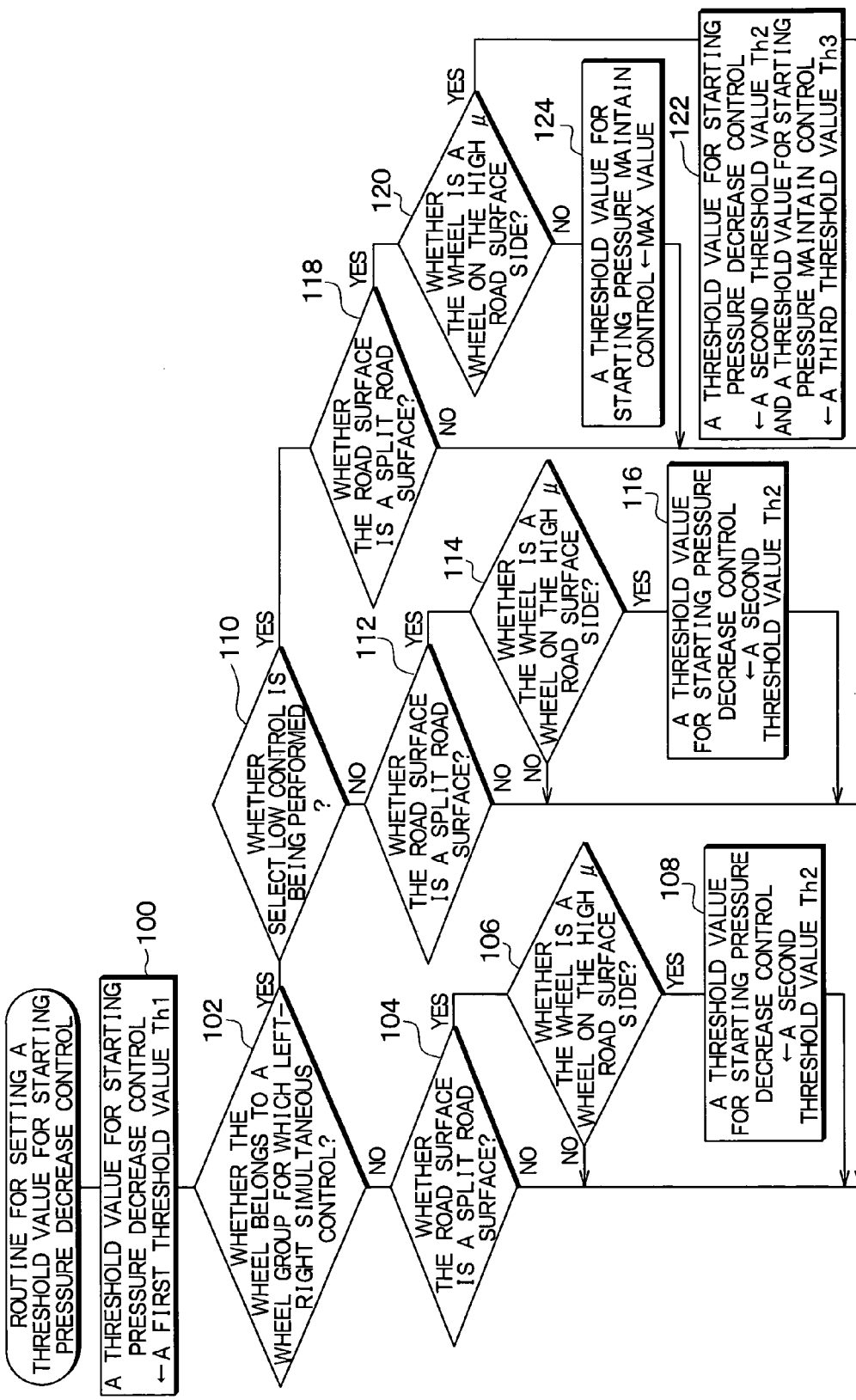
FIG. 2 is a flowchart of a routine for setting a threshold value for starting pressure decrease control in ABS control which is executed by an ECU provided in the brake system shown in FIG. 1.

The routine for setting the threshold value for starting pressure decrease control in the ABS control will now be described with reference to the flowchart in FIG. 2. In the ECU 2, the portion that executes the routine illustrated in this flowchart corresponds to the high μ road surface side pressure decrease control start threshold value setting portion and the pressure maintain control start threshold value setting portion of the present invention. The routine for setting the threshold value for starting pressure decrease control in the ABS control shown in FIG. 2 is executed for each of the four wheels, from the right front wheel FR to the left rear wheel RL, for example, every predetermined calculation cycle.

First at 100, a first threshold value Th1 is set as the threshold value for starting pressure decrease control. The relationship in this case between this first threshold value Th1 and second and third threshold values Th2 and Th3, to be described later, is as follows.

$$Th1 > Th2 > Th3 \quad \text{(Expression 1)}$$

That is, the first threshold value Th1 is set as a threshold value that is larger than both the second and third threshold values Th2 and Th3. This first threshold value Th1 is used as the threshold value for starting pressure decrease control for a low μ road surface.

Continuing on, at 102 it is determined whether the wheel belongs to a wheel group for which left-right simultaneous control is performed. The wheel group for which left-right simultaneous control is performed in this case refers to one of the wheels of a wheel group in which ABS control is executed simultaneously for the left and right wheels. Here, it is determined whether the wheel corresponds to that wheel group. For example, when the control mode is such that ABS control is performed independently in the left and right front wheels in the front wheel group and ABS control is performed simultaneously for the left and right rear wheels in the rear wheel group, the left and right rear wheels belonging to the rear wheel group correspond to wheels for which left-right simultaneous control is performed.

Data regarding which wheel group, of the front wheel group and the rear wheel group, corresponds to a wheel group for which left-right simultaneous control is performed is stored in ROM and RAM in the ECU 2. The determination at 102 is made by referencing this data.

Fundamentally, however, even in a control mode in which ABS control is performed independently on the left and right wheels of the front wheel group and ABS control is performed simultaneously on the left and right wheels of the rear wheel group, there may be cases in which, in order to perform some sort of control, the control mode changes to performing ABS control independently on all four wheels, or conversely, performing ABS control simultaneously on the left and right wheels of the front wheel group and performing ABS control performed independently on the left and right wheels of the rear wheel group. In such a case, either none of the wheels belong to a wheel group for which left-right simultaneous control is performed, or the wheel group for which left-right simultaneous control is performed changes. Therefore, in a case in which the control mode changes, a flag is set in the RAM of the ECU 2, for example, so that it is possible to distinguish the wheel group for which ABS control is performed simultaneously for the left and right wheels.

A control mode such as one which performs ABS control on all four wheels independently is disclosed in Japanese Patent Application Publication No. JP-A-06-56018, for example, and also technology which changes control modes between performing ABS control in the front and rear wheel groups simultaneously for the left and right wheels and performing it independently for the left and right wheels is disclosed in Japanese Patent Application Publication No. JP-A-01-269655, for example, are publicly known so descriptions of those details will be omitted here.

If the wheel belongs to a wheel group in which ABS control is performed independently in the left and right wheels, or is a wheel in the case where ABS control is performed independently on all four wheels, then the determination at 102 is NO and the routine proceeds to the processing at 104, where it is determined whether the road surface is a split road surface. This determination is made, for example, based on whether the difference in the road surface μ values of the road surfaces over which the left and right front wheels or the left and right rear wheels are traveling exceeds a predetermined threshold value. The road surface μ value is obtained based on the amount of wheel acceleration which corresponds to a derivative value of the wheel speed, for example, and is publicly known in Japanese Patent Application Publication No. JP-A-08-099622, for example, so a description of the details will be omitted.

If it is determined at 104 that the road surface is not a split road surface, then the routine directly ends. In this case, the first threshold value Th1 that was set at 100 is used as it is for the threshold value for starting pressure decrease control.

If, on the other hand, it is determined at 104 that the road surface is a split road surface, then the routine proceeds to the processing at 106, where it is determined whether the wheel is a wheel on the high μ road surface side which has a high road surface μ value.

If the wheel is not a wheel on the high μ road surface side, it is determined that the wheel is on the low μ road surface side and the routine directly ends. In this case as well, the first threshold value Th1 that was set at 100 is used as it is for the threshold value for starting pressure decrease control.

Also, if the wheel is on the high μ road surface side, the routine proceeds to the processing at 108, where the second threshold value Th2 is set as the threshold value for starting pressure decrease control. In this way, the second threshold value Th2 which is smaller than the first threshold value Th1 is used for the wheel on the high μ road surface side when the road surface is a split road surface.

On the other hand, when the wheel belongs to neither a wheel group for which ABS control is performed independently for the left and right wheels nor a wheel in the case where ABS control is performed independently for all four wheels, i.e., when it is a wheel group for which ABS control is performed simultaneously for the left and right wheels, the determination at 102 is YES. In this case, the routine proceeds to the processing at 110, where it is determined whether select low control is being performed. That is, it is determined here whether a control mode for either the select low control or the select high control is being employed. The select low control and the select high control in this case are also a publicly known controls that are disclosed in Japanese Patent Application Publication No. JP-A-08-099622, for example, so detailed descriptions thereof will be omitted here. There are cases, however, in which distinctions are made between vehicles in which select low control is performed and vehicles in which select high control is performed depending on the vehicle model, for example. There are also cases in which the control switches between select low control and select high control in a single vehicle depending on the vehicle running conditions. In either of these cases, it is possible to distinguish between whether the select low control is being employed or whether the select high control is being employed by a flag indicative of the control mode being set in the RAM of the ECU 2, for example.

If the determination at 110 is NO, the routine proceeds to the processing at 112, where a routine is executed for setting the threshold value for starting pressure decrease control corresponding to when the select high control is being employed. That is, at 112 to 116, processing similar to that at 104 to 108 is executed. That is, if the road surface is a split road surface and the wheel is a wheel on the high μ road surface side, the second threshold value Th2 is set as the threshold value for starting pressure decrease control. Otherwise, the threshold value for starting pressure decrease control remains the first threshold value Th1.

If the determination at 110 is YES, then the routine proceeds to the processing at 118, where the routine is executed for setting the threshold value for starting pressure decrease control corresponding to when the select low control is being employed.

First at 118, it is determined whether the road surface is a split road surface, just as it is at 104. If the road surface is not a split road surface, the routine directly ends. In this case, the threshold value for starting pressure decrease control remains at the first threshold value Th1. Also, if the road surface is a split road surface, the routine proceeds to the processing at 120.

At 120, it is determined whether the wheel is a wheel on the high μ road surface side, just as it is at 106. If the wheel is a wheel on the high μ road surface side, then the second threshold value Th2 is set as the threshold value for starting pressure decrease control and the third threshold value Th3 is set as the threshold value for starting pressure maintain control.

Here, the third threshold value Th3 is smaller than the second threshold value Th2, i.e., it is the smallest threshold value among the first to the third threshold values Th1 to Th3, as described above.

Even if the slip ratio of the wheel on the high μ road surface side has not reached the second threshold value Th2 which becomes the threshold value for starting pressure decrease control, when there a possibility that it may exceed the second threshold value Th2, this third threshold value Th3 is tentatively used as a threshold value when pressure maintain control is performed before the pressure decrease control is started. The reason for performing this pressure maintain control will be described in detail later.

Also, if the wheel is not a wheel on the high μ road surface side, the threshold value for starting pressure decrease control remains unchanged from the first threshold value Th1, and the threshold value for starting pressure maintain control is set to the maximum value (max value). This maximum value refers to a value that is greater than the first threshold value Th1, and is a value at which pressure maintain control, to be described later, will not be performed when the wheel is a wheel on the low μ road surface side (typically in ABS control, the maximum value refers to a value that is set as the threshold value for starting pressure maintain control, and is a value that is greater than the third threshold value Th3 (i.e., maximum value>third threshold value Th3)).

Figure 3:
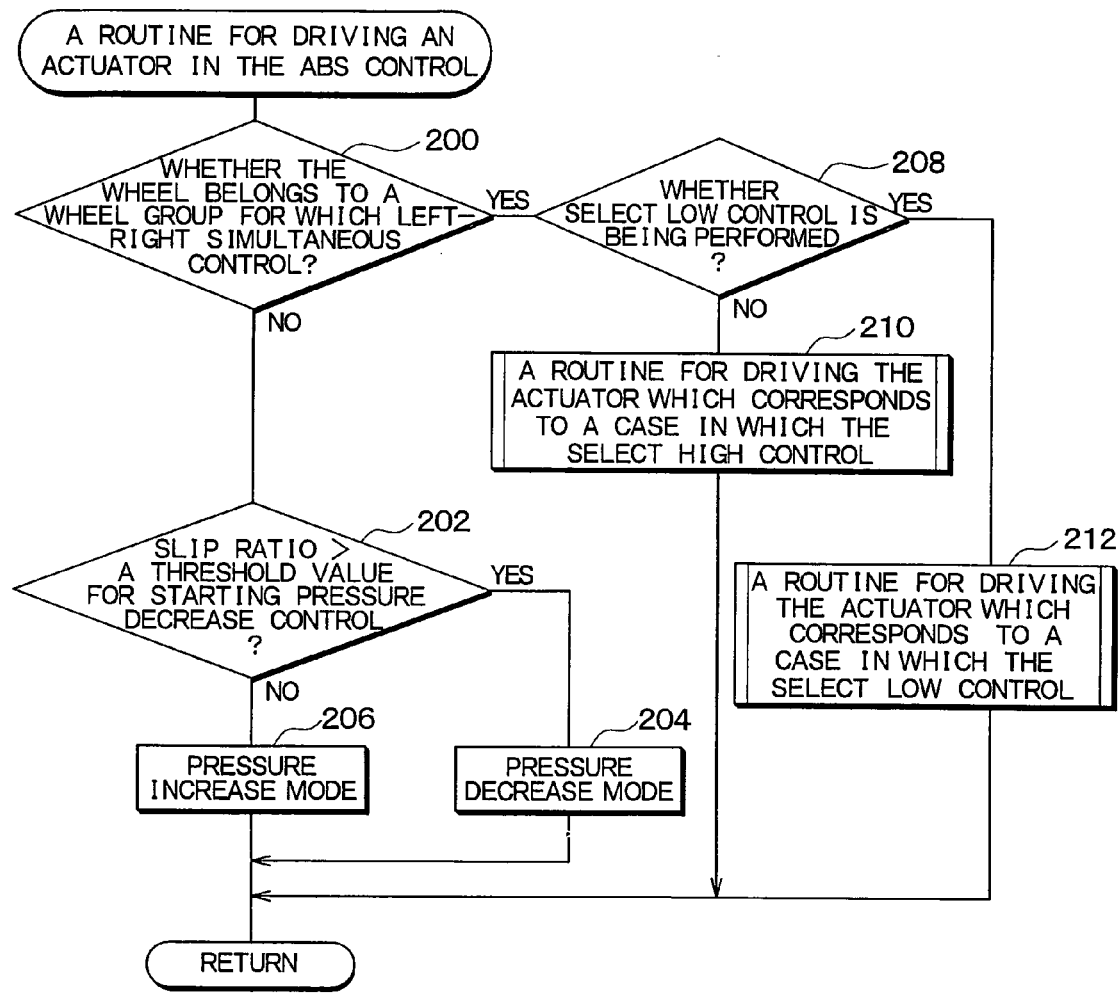
FIG. 3 is a flowchart of a routine for driving an actuator in the ABS control which is executed by the ECU provided in the brake system shown in FIG. 1.

The routine for setting the threshold value for starting pressure decrease control then ends. Next, the routine for driving the actuator in the ABS control is executed based on the threshold value for starting pressure decrease control that was set in the above routine. The routine for driving the actuator in the ABS control will be described with reference to the flowcharts in FIGS. 3 to 5. The routine for driving the actuator in the ABS control illustrated in these drawings is executed for each of the four wheels, e.g., the right front wheel FR to the left rear wheel RL, every predetermined calculation cycle.

First at 200, it is determined whether the wheel belongs to a wheel group for which left-right simultaneous control is performed. This determination is made just as it is at 102 described above. If the determination at 200 is NO, then the wheel belongs to a wheel group for which ABS control is performed independently in the left and right wheels or a wheel in the case where ABS control is performed independently in all four wheels. Accordingly, a routine for driving the actuator which corresponds to that case is executed.

More specifically, at 202 it is determined whether the slip ratio exceeds the threshold value for starting pressure decrease control. In this case, the threshold value for starting pressure decrease control is a value that was set when the ABS control is performed independently in the left and right wheels or all four wheels. When the road surface is a split road surface and the wheel is a wheel on the high μ road surface side, the threshold value for starting pressure decrease control becomes the second threshold value Th2. In any other case, the threshold value for starting pressure decrease control becomes the first threshold value Th1.

If the determination here is YES, it is determined that the slip ratio is continuing to increase and there is a possibility that the wheel may lock. Therefore, the routine proceeds to the processing at 204, where the pressure decrease mode is set, after which the routine ends. Also, if the determination is NO, it is determined that the slip ratio is not high enough that the wheel may lock, so the routine proceeds to the processing at 206, where the pressure increase mode is set, after which the routine ends.

If, on the other hand, the determination at 200 is YES, it is determined that the wheel belongs to a wheel group for which ABS control is to be performed simultaneously for the left and right wheels, and the routine proceeds to the processing at 208.

At 208 it is determined whether the select low control is being performed. That is, it is determined here whether the control mode of either the select low control or the select high control is currently being employed. This determination is made just as it is at 110.

If the determination at 208 is NO, the routine proceeds to the processing at 210, where a routine is executed for driving the actuator which corresponds to a case in which the select high control is being employed. If the determination is YES, the routine proceeds to the processing at 212, where a routine is executed for driving the actuator which corresponds to a case in which the select low control is being employed. The routine for driving the actuator which corresponds to a case in which the select high control is being employed and the routine for driving the actuator which corresponds to a case in which the select low control is being employed are illustrated in the flowcharts in FIGS. 4 and 5 and will be described with reference to those drawings.

Figure 4:
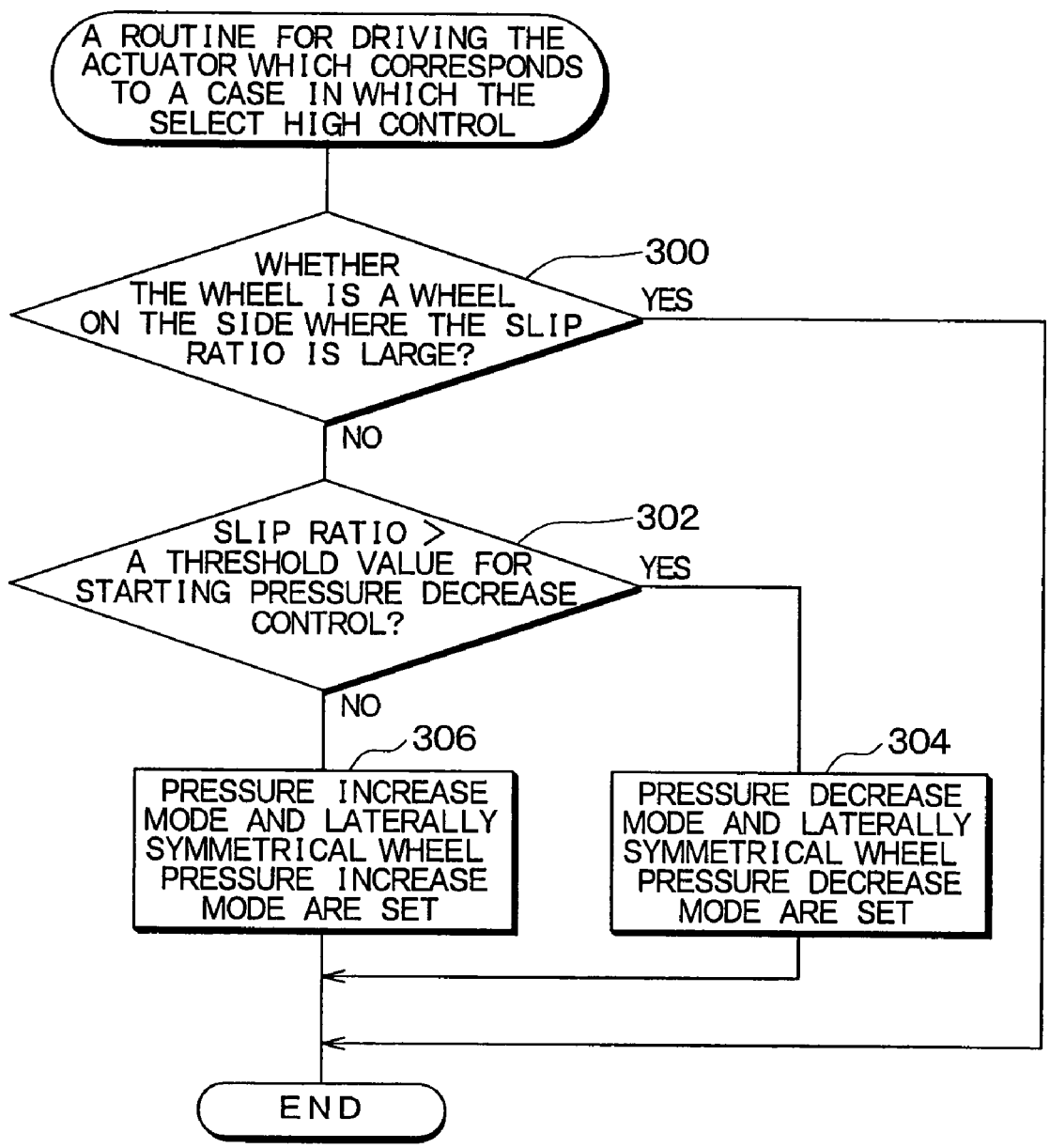
FIG. 4 is a flowchart of a routine for driving an actuator when a select high control in FIG. 3 is employed.

When the select high control is being employed, it is first determined at 300 whether the wheel is a wheel on the side where the slip ratio is large, as shown in FIG. 4. The wheel on the side where the slip ratio is large in this case refers to the wheel where the slip ratio is increasing when compared to the slip ratio of another wheel of the wheel group to which that wheel belongs.

If the determination at 300 is YES, it is determined that the wheel is a wheel on the side with a large slip ratio, and the routine directly ends. That is, when the select high control is selected, the start of pressure decrease control on the wheel with the lower wheel speed, i.e., the wheel on the low μ road surface side, is delayed until the slip ratio of the wheel with the higher wheel speed, i.e., the wheel on the high μ road surface side, exceeds the threshold value for starting pressure decrease control of the ABS control. Therefore, when the wheel is a wheel on the side with a large slip ratio, it is determined to be the wheel with the lower wheel speed, i.e., the wheel on the low μ road surface side, and the routine directly ends.

Also, if the determination at 300 is NO, it is determined that the wheel is not the wheel on the side with the large slip ratio, and the routine proceeds to the processing at 302, where it is determined whether the slip ratio exceeds the threshold value for starting pressure decrease control. The threshold value for starting pressure decrease control in this case is a threshold value that is set when the select high control is being employed, and is made the second threshold value Th2 if the road surface is a split road surface and the wheel is a wheel on the high μ road surface side. In any other case, the threshold value for starting pressure decrease control is made the first threshold value Th1.

If the determination here is YES, then it is determined that the slip ratio is continuing to increase and there is a possibility that the wheel may lock. Therefore, the routine proceeds to the processing at 304. Accordingly, the pressure decrease mode is set for the wheel for which the actuator driving control routine is currently being executed. At the same time, the pressure decrease mode is also set for the wheel that is laterally symmetrical to that wheel for which the pressure decrease mode is set. Then the routine for driving the actuator ends.

Also, if the determination here is NO, it is determined that the slip ratio is not high enough that the wheel may lock, so the routine proceeds to the processing at 306. Accordingly, the pressure increase mode is set for the wheel for which the actuator driving control routine is currently being executed. At the same time, the pressure increase mode is also set for the wheel that is laterally symmetrical to that wheel for which the pressure increase mode is set. Then the routine for driving the actuator ends.

Figure 5:
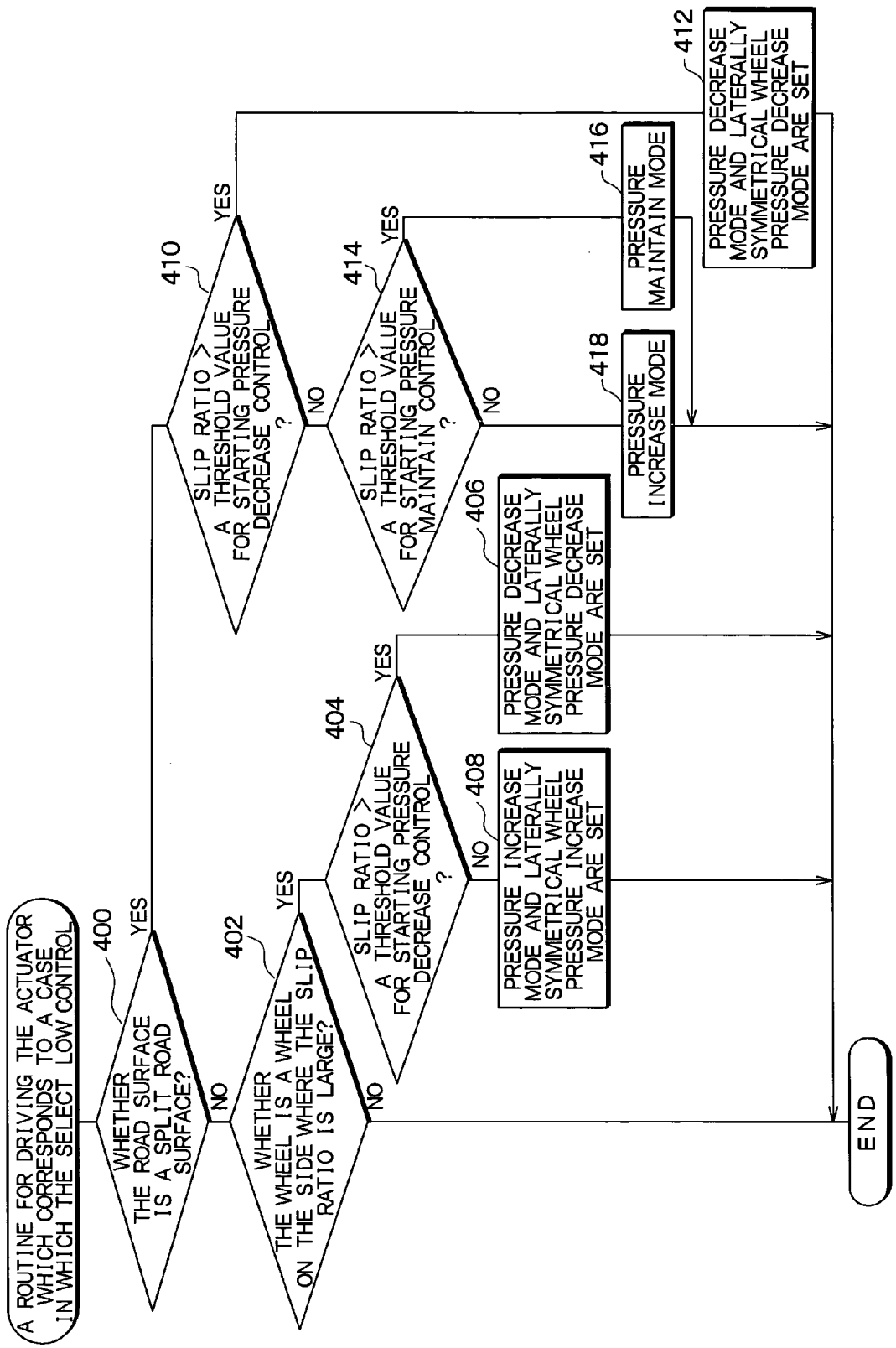
FIG. 5 is a flowchart of a routine for driving an actuator when a select low control in FIG. 3 is employed.

When the select low control is employed, it is first determined at 400 whether the road surface is a split road surface, as illustrated in FIG. 5. This determination is made just as it is at 104 described above.

If it is determined at 400 that the road surface is not a split road surface, the routine proceeds to the processing at 402, where it is determined whether the wheel is a wheel on the side with a large slip ratio. The wheel on the side with a large slip ratio, in this case, has the same meaning as it does at 300 described above.

If the determination at 402 is NO, then it is determined that the wheel is not a wheel on the side with a large slip ratio and the routine directly ends. That is, when the select low control is employed and the road surface is not a split road surface, the start of pressure decrease control on the wheel with the higher wheel speed, i.e., the wheel on the side with the lower slip ratio, is delayed until the slip ratio of the wheel with the lower wheel speed, i.e., the wheel on the side with the larger slip ratio, exceeds the threshold value for starting pressure decrease control of the ABS control. Therefore, when the wheel is not the wheel on the side with the large slip ratio, it is determined to be the wheel with the higher wheel speed, and the routine directly ends.

If the determination at 402 is YES, it is determined that the wheel is a wheel on the side with a large slip ratio and the routine proceeds to the processing at 404, where it is determined whether the slip ratio exceeds the threshold value for starting pressure decrease control. The threshold value for starting pressure decrease control in this case is a threshold value that is set when the road surface is not a split road surface while the select low control is being employed, and is the first threshold value Th1.

If the determination here is YES, it is determined that the slip ratio is continuing to increase and there is a possibility that the wheel may lock. Therefore, the routine proceeds to the processing at 406. Accordingly, the pressure decrease mode is set for the wheel for which the actuator driving control routine is currently being executed. At the same time, the pressure decrease mode is also set for the wheel that is laterally symmetrical to that wheel for which the pressure decrease mode is set. Then the routine for driving the actuator ends.

Also, if the determination here is NO, it is determined that the slip ratio is not high enough that the wheel may lock, so the routine proceeds to the processing at 408. Accordingly, the pressure increase mode is set for the wheel for which the actuator driving control routine is currently being executed. At the same time, the pressure increase mode is also set for the wheel that is laterally symmetrical to that wheel for which the pressure increase mode is set. Then the routine for driving the actuator ends.

On the other hand, if it is determined at 400 that the road surface is a split road surface, then the routine proceeds to the processing at 410, where it is determined whether the slip ratio exceeds the threshold value for starting pressure decrease control. The threshold value for starting pressure decrease control in this case is a threshold value that is set when the road surface is a split road surface while the select low control is being employed, and differs depending on whether the wheel is on the high µ road surface side.

More specifically, as illustrated at 120 to 124 described above, the threshold value for starting pressure decrease control is set at the second threshold value Th2 if the wheel is on the high µ road surface side, and is set at the first threshold value Th1 if the wheel is on the low µ road surface side.

If the determination at 410 is YES, the routine proceeds to the processing at 412. Accordingly, the pressure decrease mode is set for the wheel for which the actuator driving control routine is currently being executed. At the same time, the pressure decrease mode is also set for the wheel that is laterally symmetrical to that wheel for which the pressure decrease mode is set. Then the routine for driving the actuator ends.

On the other hand, if the determination at 410 is NO, the routine proceeds to the processing at 414, where it is determined whether the slip ratio exceeds the threshold value for starting pressure maintain control. The threshold value for starting pressure maintain control in this case is a threshold value that is set when the road surface is a split road surface when the select low control is being employed, and differs depending on whether the wheel is on the high µ road surface side.

More specifically, as illustrated at 120 to 124 described above, the threshold value for starting pressure maintain control is set at the third threshold value Th3 if the wheel is on the high µ road surface side, and is set at the maximum value if the wheel is on the low µ road surface side.

If the determination at 414 is YES, the routine proceeds to the processing at 416, where the pressure maintain mode is set. If the determination at 414 is NO, on the other hand, the routine proceeds to the processing at 418, where the pressure increase mode is set. The actuator driving control routine then ends.

The operation on a split road surface of the brake system that makes up the ABS control system in which the routine for setting the threshold value for starting pressure decrease control and the actuator driving control routine described above are executed will be described with reference to FIG. 6.

Figure 6:
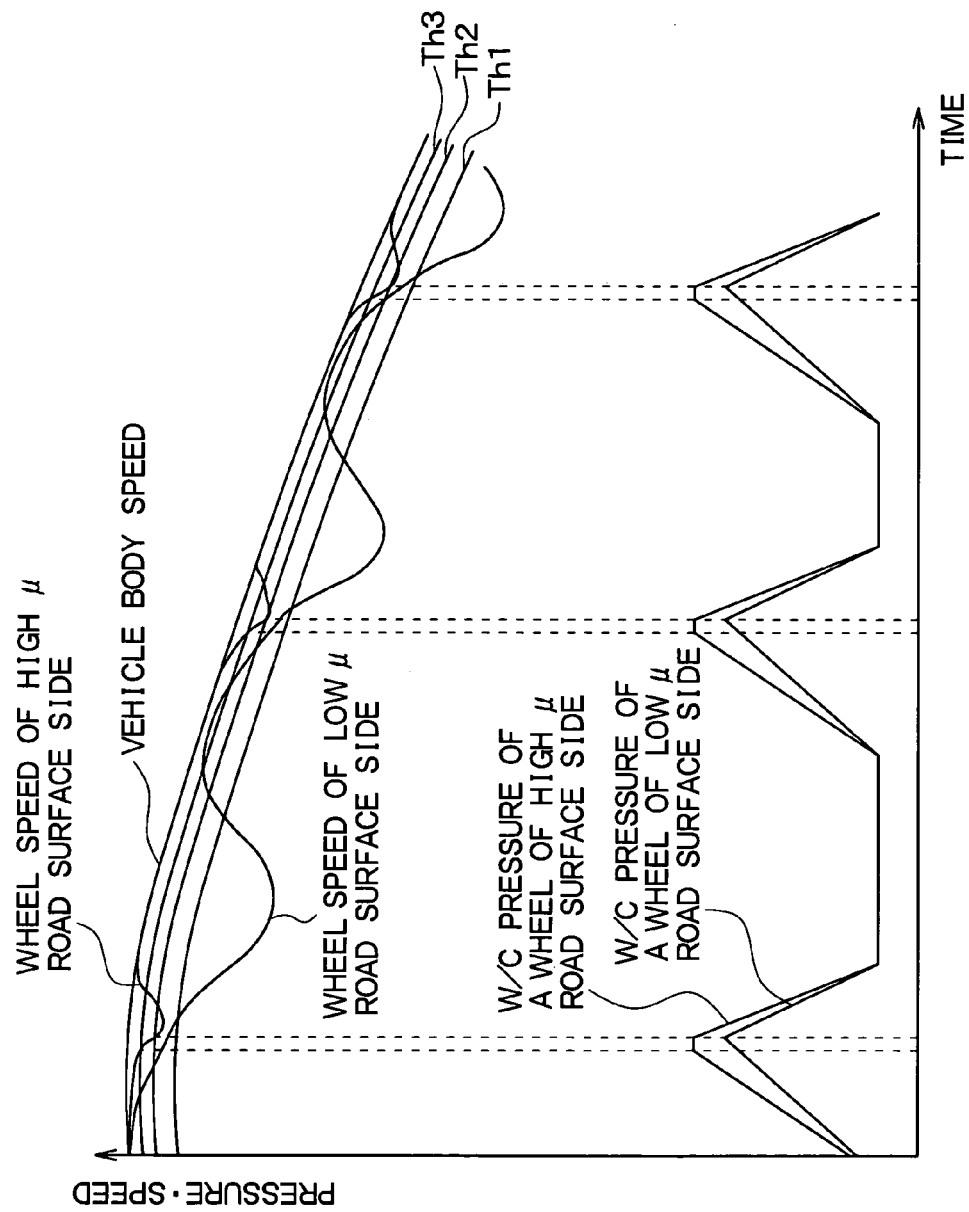
FIG. 6 is a timing chart of W/C pressure and wheel speed, and vehicle speed (estimated vehicle body speed) during braking on a split road surface when the select low control is employed.

FIG. 6 is a timing chart of the W/C pressure and wheel speed, and the vehicle speed (estimated vehicle body speed) during braking on a split road surface when the select low control is employed. However, the wheel speed and the W/C pressure shown in FIG. 6 are representative of the wheel speed and W/C pressure of each wheel which belongs to a wheel group for which ABS control is executed simultaneously for the left and right wheels. Also, the first to the third threshold values Th1 to Th3 shown in FIG. 6 are not indicative of the slip ratio itself, but of the wheel speed, with respect to the vehicle speed at that time, at which the threshold value for starting pressure decrease control will be reached.

As shown in the drawing, in the case of a split road surface, the wheel speed of the wheel on the low µ road surface side decreases with respect to the vehicle speed more so than does the wheel speed of the wheel on the high µ road surface side. However, when there is variation in the braking force generated in the wheels on the high µ road surface side and the low µ road surface side and the braking force of the wheel on the high µ road surface side is larger than the braking force of the wheel on the low µ road surface side, the W/C pressure of the wheel on the high µ road surface side increases earlier than the W/C pressure of the wheel on the low µ road surface side, as shown in FIG. 6.

Therefore, even if it only takes a short time to exceed the first threshold value Th1 that becomes the threshold value for starting pressure decrease control of the ABS control when the wheel speed of the wheel on the low µ road surface side decreases with respect to the vehicle speed, the wheel speed of the wheel on the high µ road surface side ends up decreasing with respect to the vehicle speed.

However, with the present embodiment, when the select low control is being employed, the second threshold value Th2 which is smaller than the first threshold value Th1 is set as the threshold value for starting pressure decrease control for the wheel on the high µ road surface side. Then when the slip ratio of the wheel on the high µ road surface side exceeds the second threshold value Th2, the pressure decrease control in the ABS control is started even if the slip ratio of the wheel on the low µ road surface side does not exceed the first threshold value Th1.

Accordingly, it is possible to prevent the vehicle running state from becoming unstable due to the wheel speed of the wheel on the high µ road surface side from decreasing with respect to the vehicle speed.

Furthermore, in the present embodiment, when the select low control is being employed, the pressure maintain control is started when the slip ratio of the wheel on the high µ road surface side exceeds the third threshold value Th3 even if it does not exceed the second threshold value Th2. The reason for this is as follows.

That is, when the wheel speed of the wheel on the high μ road surface side starts to decrease with respect to the vehicle speed, it is desirable to start the pressure decrease control as early as possible to stop that decrease. If the second threshold value Th2 is set too small in order to do that, however, the second threshold value Th2 could be exceeded even if the wheel speed fluctuated due to wheel vibration, for example. Even in this case, if the pressure decrease control is started, more braking force than is necessary may be lost, which is undesirable.

Therefore, as described above, when the third threshold value Th3, which is smaller than the second threshold value Th2, is set and the slip ratio of the wheel on the high μ road surface side exceeds the third threshold value Th3, the pressure maintain control, not the pressure decrease control, is first started. Accordingly, the W/C pressure is maintained, thereby enabling the braking pressure to be maintained. Thus, it is possible to prevent a loss in braking force as would otherwise happen if the pressure decrease control had been started.

When the slip ratio is obtained using the obtained wheel speed itself, i.e., using the real value, there is a possibility that the threshold value for starting pressure decrease control or the threshold value for starting pressure maintain control may be exceeded due to the fluctuation in the wheel speed caused by wheel vibration or the like. Therefore, it is preferable to smooth the obtained real value of the wheel speed by performing a software filtering process in the ECU 2, and obtain the slip ratio using the wheel speed after smoothing. Accordingly, the pressure decrease control and the pressure maintain control can be executed only when necessary.

As described above, according to the brake system that forms the ABS control system of the present embodiment, even if there is variation in the braking force generated in the wheels of the high μ road surface side and the low μ road surface side and the braking force of the wheel on the high μ road surface side is greater than the braking force of the wheel on the low μ road surface side, it is possible to keep the wheel speed of the wheel on the high μ road surface side from decreasing too much with respect to the vehicle speed.

Thus, in the ABS control system which performs ABS control simultaneously in the left and right wheels in at least one of the front wheel group or the rear wheel group, it is possible to improve vehicle stability also when running on a split road surface when there is variation in the braking force generated in the left and right wheels of a wheel group in which ABS control is performed simultaneously in the left and right wheels.

Other Embodiments

According to the first embodiment, one value, i.e., the second threshold value Th2, is set as the threshold value for starting pressure decrease control of the wheel on the high μ road surface side of a split road surface. Alternatively, however, a plurality of values may be set. In this case, the pressure decrease time can be adjusted based on which threshold value for starting pressure decrease control, of the plurality that were set, was exceeded by the slip ratio of the wheel on the high μ road surface side. In the ECU 2, the portion that sets the pressure decrease time in this kind of pressure decrease control corresponds to the pressure decrease time setting portion.

Figure 7:
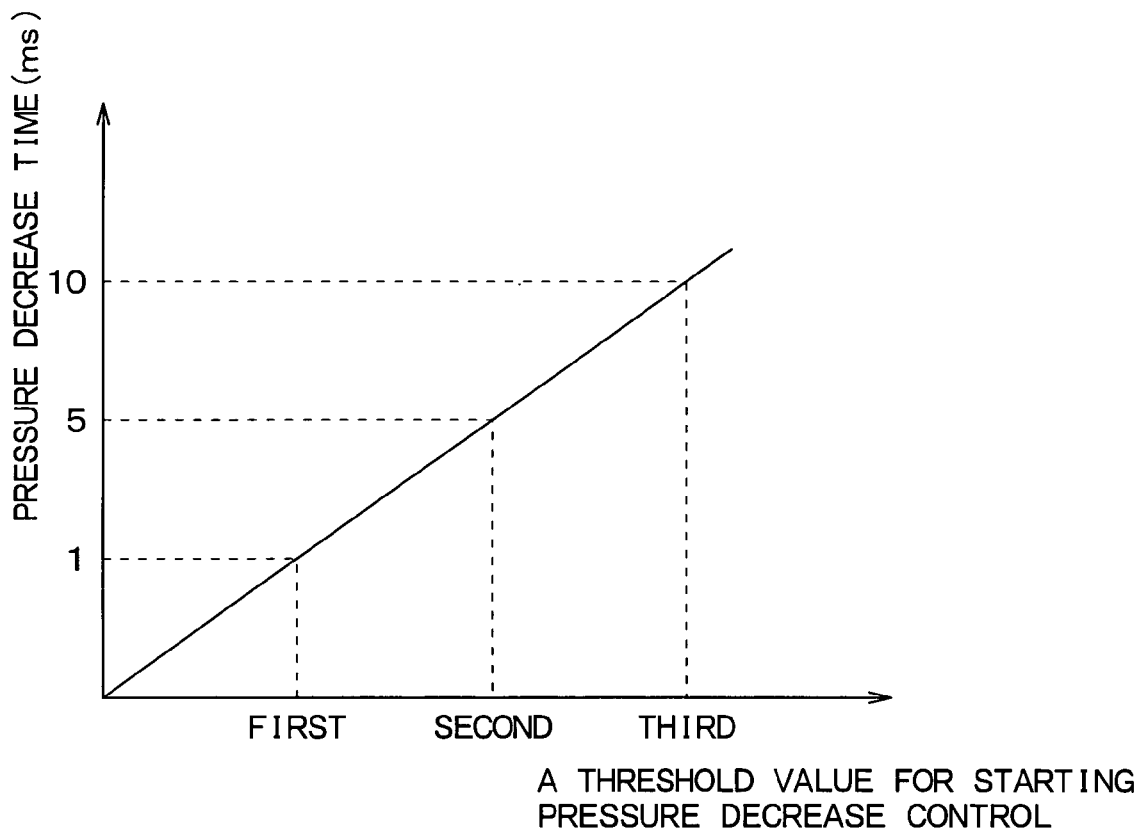
FIG. 7 is a graph illustrating the relationship between the pressure decrease time and threshold values for starting pressure decrease control shown by another embodiment.
Figure 8A:
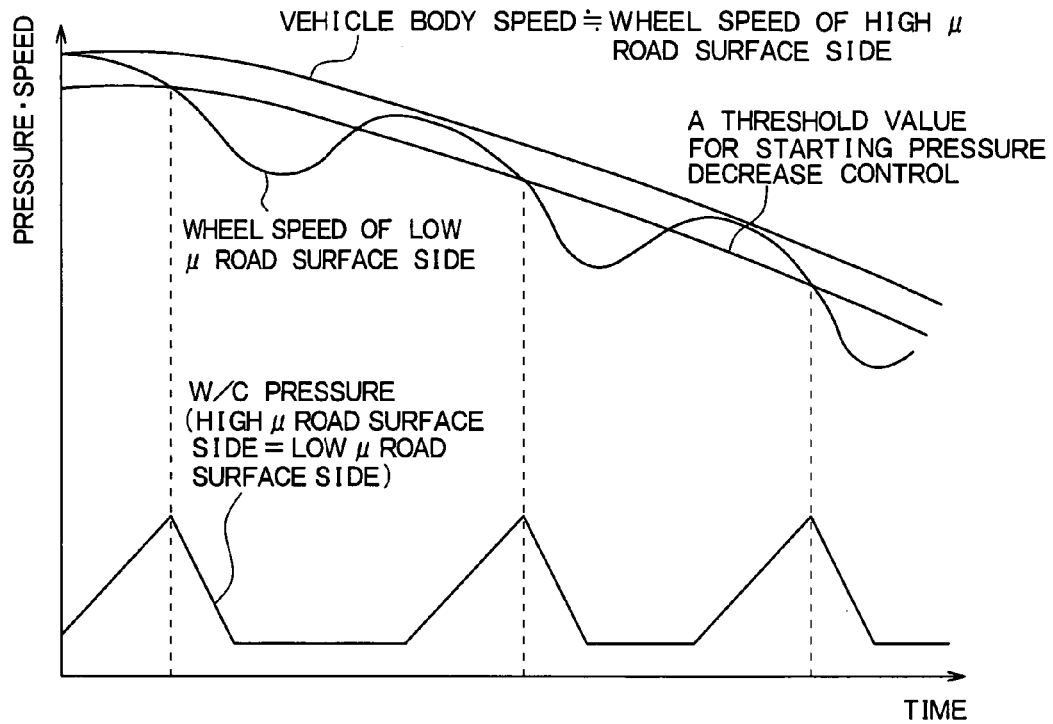
FIG. 8 is a timing chart of W/C pressure and wheel speed, and vehicle speed (estimated vehicle body speed) during braking on a split road surface when the select low control is employed in a related ABS control system.
Figure 8B:
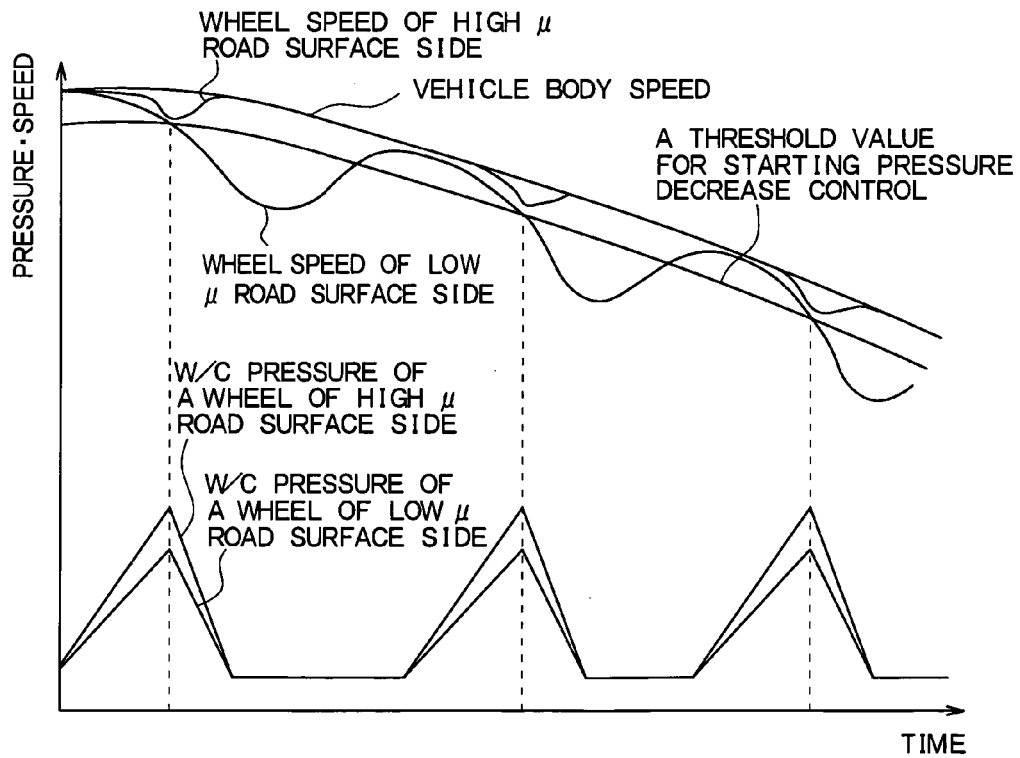

For example, the relationship between the threshold value for starting pressure decrease control and the pressure decrease time can be illustrated as in FIG. 7. That is, the pressure decrease control starts when a first threshold value which is the smallest of the threshold values for starting pressure decrease control is exceeded, but even after the pressure decrease control starts, the wheel speed continues to decrease with respect to the vehicle speed. Therefore, if the first threshold value which is the smallest of the threshold values for starting pressure decrease control is exceeded, the pressure decrease time is first set to 1 ms, for example. Then if a second threshold value which is larger than the first threshold value is exceeded even when the pressure decrease control is started, the pressure decrease time is then set to 5 ms, for example. Moreover, if a third threshold value which is larger than the second threshold value is also exceeded, the pressure decrease time is set to 10 ms, for example. In this manner, it is possible to set the pressure decrease time according to the slip ratio of the wheel on the high μ road surface side.

Of course, even if a plurality of threshold values for starting pressure decrease control are not set, the peak value of the slip ratio after the pressure decrease control has started can be obtained directly and the pressure decrease time can be set so as to become longer the larger that peak value.

While the above description is of the preferred embodiments of the present invention, it should be appreciated that the invention may be modified, altered, or varied without deviating from the scope and fair meaning of the following claims.

What is claimed is:

1. An ABS control system for providing ABS control on a split road surface, which comprises:
   a plurality of wheels including front and rear wheels on right and left sides of the vehicle, one of the right and left sides on a low μ road surface side of the vehicle, and another of the right and left sides being on a high μ road surface side of the vehicle;
   a plurality of wheel cylinders respectively supplying braking pressure to brakes arranged to stop rotation of the wheels;
   a control unit including a pressure decrease mode that continues decreasing a pressure in a respective wheel cylinder corresponding to a respective wheel, the control unit:
      calculating slip ratios for the rear wheels of the vehicle and identifying a rear wheel on the low μ road surface side of the vehicle and a rear wheel on the high μ road surface side of the vehicle,
      comparing the slip ratio of the rear wheel identified as on the low μ road surface side of the vehicle to a first threshold value,
      comparing the slip ratio of the rear wheel identified as on the high μ road surface side of the vehicle to a second threshold value, the second threshold value being smaller than the first threshold value,
      initiating a select low control, when the slip ratio of the rear wheel identified as on the low μ road surface side of the vehicle exceeds the first threshold value and the slip ratio of the rear wheel identified as on the high μ road surface side does not exceed the second threshold value, by simultaneously executing a pressure decrease mode by continuing decreasing the pressure in wheel cylinders for the rear wheel identified as on the low μ road surface side of the vehicle and for the rear wheel identified as on the high μ road surface side of the vehicle, and
      initiating a select high μ road control, when the slip ratio of the rear wheel identified as on the low μ road surface side of the vehicle does not exceed the first threshold value and the slip ratio of the rear wheel identified as on the high μ road surface side of the vehicle exceeds the second threshold value, by simultaneously executing the pressure decrease mode by continuing decreasing the pressure in wheel cylinders for the rear wheel identified as on the low μ road surface side of the vehicle and for the rear wheel identified as on the high μ road surface side of the vehicle.

2. The ABS control system for providing ABS control on a split road surface according to claim 1, further comprising:
a pressure decrease time setting portion for setting a pressure decrease time of the pressure decrease control in the ABS control longer as the slip ratio of the rear wheel identified as on the high μ road surface side becomes larger when the slip ratio of the rear wheel identified as on the high μ road surface side exceeds the second threshold value.

3. The ABS control system for providing ABS control on a split road surface according to claim 2, wherein the high μ road surface side pressure decrease control start threshold value setting portion sets a plurality of the second threshold values at different values; the pressure decrease control in the ABS control is started when the slip ratio of the rear wheel identified as on the high μ road surface side exceeds a first and smallest second threshold value from among the plurality of second threshold values; and the pressure decrease time setting portion sets the pressure decrease time according to the number of second threshold values exceeded from among the plurality of second threshold values that were set at different values.

4. The ABS control system for providing ABS control on a split road surface according to claim 2, wherein the pressure decrease control in the ABS control is started when the slip ratio of the rear wheel identified as on the high μ road surface side exceeds the second threshold value, and the pressure decrease time setting portion obtains a peak value after the slip ratio of the rear wheel identified as on the high μ road surface side exceeds the second threshold value and sets the pressure decrease time according to the peak value.

5. The ABS control system for providing ABS control on a split road surface according to claim 1, further comprising:
a pressure maintain control start threshold value setting portion which sets a third threshold value which is smaller than the second threshold value as a threshold value for starting pressure maintain control for the rear wheel identified as on the high μ road surface side when the select low control is executed,
wherein the pressure maintain control is performed on the rear wheel identified as on the high μ road surface side when the slip ratio of the rear wheel identified as on the high μ road surface side exceeds the third threshold value.

6. The ABS control system for providing ABS control on a split road surface according to claim 1, wherein the select low control starts the pressure decrease control in left and right wheels simultaneously in the ABS control.

7. The ABS control system for providing ABS control on a split road surface according to claim 1, wherein there is variation in the braking force generated between the rear wheel identified as on the high μ road surface side and the rear wheel identified as on the low μ road surface side.

8. An ABS control system for providing ABS control on a split road surface, which comprises:
a plurality of wheels including front and rear wheels on right and left sides of the vehicle, one of the right and left sides being on a relatively low friction side of the vehicle, and another of the right and left sides being on a relatively high friction side of the vehicle;
a plurality of electromagnetic valves respectively supplying braking pressure to brakes arranged to stop rotation of the wheels;
a control unit coupled to and controlling the electromagnetic valves for decreasing a pressure in a respective brake corresponding to a respective wheel, the control unit:
calculating slip ratios for the wheels of the vehicle and identifying at least one of a front wheel and a rear wheel on the relatively low friction surface side of the vehicle and identifying another front wheel and another rear wheel on the relatively high friction surface side of the vehicle,
comparing the slip ratio of the at least one front wheel and rear wheel identified as on the relatively low friction side of the vehicle to a first threshold value,
comparing the slip ratio of the another front wheel and rear wheel identified as on the relatively high friction side of the vehicle to a second threshold value, the second threshold value being smaller than the first threshold value,
when the slip ratio of the at least one front wheel and rear wheel identified as on the relatively low friction surface side of the vehicle exceeds the first threshold value and the slip ratio of the another front and rear wheel identified as on the relatively high friction surface side of the vehicle does not exceed the second threshold value, simultaneously decreasing the braking pressure in the brakes for the at least one front wheel and rear wheel on the relatively low friction side of the vehicle and for the another front and rear wheel identified as on the relatively high friction side of the vehicle, and
when the slip ratio of the at least one front wheel and rear wheel identified as on the relatively low friction side of the vehicle does not exceed the first threshold value and the slip ratio of the another front and rear wheel identified as on the relatively high friction side of the vehicle exceeds the second threshold value, simultaneously decreasing the braking pressure in the brakes for the at least one front wheel and rear wheel on the relatively low friction side of the vehicle and for the another front and rear wheel identified as on the relatively high friction side of the vehicle.

9. An ABS control system for providing ABS control on a split road surface, which comprises:
a plurality of wheels including groups of wheels arranged on the front and rear of a vehicle, each group of wheels having wheels on right and left sides of the vehicle, one of the right and left sides on a low μ road surface side of the vehicle, and another of the right and left sides being on a high μ road surface side of the vehicle;
a plurality of wheel cylinders respectively supplying braking pressure to brakes arranged to stop rotation of the wheels;
a control unit including a pressure decrease mode that continues decreasing a pressure in a respective wheel cylinder corresponding to a respective wheel, the control unit:
calculating slip ratios for the wheels of the vehicle and identifying at least one wheel of each group of the plurality of wheels on the low μ road surface side of the vehicle and at least one wheel of the plurality of wheels on the high μ road surface side of the vehicle,
comparing the slip ratio of the at least one wheel of the plurality of wheels identified as on the low μ road surface side of the vehicle to a first threshold value, comparing the slip ratio of the at least one wheel of the plurality of wheels identified as on the high μ road surface side of the vehicle to a second threshold value, the second threshold value being smaller than the first threshold value, initiating a select low control within each group of the plurality of wheels, when the slip ratio of the at least one wheel identified as on the low μ road surface side of the vehicle exceeds the first threshold value and the slip ratio of the at least one wheel identified as on the high μ road surface side does not exceed the second threshold value, by simultaneously executing a pressure decrease mode by continuing decreasing the pressure in wheel cylinders for the at least one wheel identified as on the low μ road surface side of the vehicle and for the at least one wheel identified as on the high μ road surface side of the vehicle for each group of the plurality of wheels, and initiating a select high μ road control within each group of the plurality of wheels, when the slip ratio of the at least one wheel identified as on the low μ road surface side of the vehicle does not exceed the first threshold value and the slip ratio of the at least one wheel identified as on the high μ road surface side of the vehicle exceeds the second threshold value, by simultaneously executing a pressure decrease mode by continuing decreasing the pressure in wheel cylinders for the at least one wheel identified as on the low μ road surface side of the vehicle and for the at least one wheel identified as on the high μ road surface side of the vehicle for each group of the plurality of wheels.

10. The ABS control system for providing ABS control on a split road surface according to claim 9, further comprising:
a pressure decrease time setting portion for setting a pressure decrease time of the pressure decrease control in the ABS control longer as the slip ratio of the at least one wheel identified as on the high μ road surface side becomes larger when the slip ratio of the at least one wheel identified as on the high μ road surface side exceeds the second threshold value.

11. The ABS control system for providing ABS control on a split road surface according to claim 10, wherein the high μ road surface side pressure decrease control start threshold value setting portion sets a plurality of the second threshold values at different values; the pressure decrease control in the ABS control is started when the slip ratio of the at least one wheel identified as on the high μ road surface side exceeds a first and smallest second threshold value from among the plurality of second threshold values; and the pressure decrease time setting portion sets the pressure decrease time according to the number of second threshold values exceeded from among the plurality of second threshold values that were set at different values.

12. The ABS control system for providing ABS control on a split road surface according to claim 10, wherein the pressure decrease control in the ABS control is started when the slip ratio of the at least one wheel identified as on the high μ road surface side exceeds the second threshold value, and the pressure decrease time setting portion obtains a peak value after the slip ratio of the at least one wheel identified as on the high μ road surface side exceeds the second threshold value and sets the pressure decrease time according to the peak value.

13. The ABS control system for providing ABS control on a split road surface according to claim 9, further comprising:
a pressure maintain control start threshold value setting portion which sets a third threshold value which is smaller than the second threshold value as a threshold value for starting pressure maintain control for the at least one wheel identified as on the high μ road surface side when the select low control is executed,
wherein the pressure maintain control is performed on the at least one wheel identified as on the high μ road surface side when the slip ratio of the at least one wheel identified as on the high μ road surface side exceeds the third threshold value.

14. The ABS control system for providing ABS control on a split road surface according to claim 9, wherein the select low control starts the pressure decrease control in left and right wheels simultaneously in the ABS control.

15. The ABS control system for providing ABS control on a split road surface according to claim 9, wherein there is variation in the braking force generated between the at least one wheel identified as on the high μ road surface side and the at least one wheel identified as on the low μ road surface side.

* * * * *